United States Patent
Hakiri et al.

(10) Patent No.: US 7,798,629 B2
(45) Date of Patent: Sep. 21, 2010

(54) PIGMENT DISPERSION, INKJET-INK USING THE PIGMENT DISPERSION, IMAGE FORMING PROCESS, AND IMAGE FORMING APPARATUS

(75) Inventors: Minoru Hakiri, Numazu (JP); Keishi Taniguchi, Susono (JP); Yuji Natori, Numazu (JP); Yasuyuki Hosogi, Numazu (JP); Shigeo Hatada, Numazu (JP); Shin Hasegawa, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 468 days.

(21) Appl. No.: 11/891,352

(22) Filed: Aug. 10, 2007

(65) Prior Publication Data

US 2008/0036840 A1 Feb. 14, 2008

(30) Foreign Application Priority Data

Aug. 11, 2006 (JP) ............................. 2006-219739

(51) Int. Cl.
*B41J 2/01* (2006.01)
(52) U.S. Cl. ..................... 347/100; 347/95; 106/31.6; 523/160
(58) Field of Classification Search .............. 347/100, 347/95; 106/31.13, 31.6, 31.9; 523/160
See application file for complete search history.

(56) References Cited

U.S. PATENT DOCUMENTS

| 6,143,807 | A | 11/2000 | Lin et al. |
|---|---|---|---|
| 6,328,393 | B1 | 12/2001 | Lin et al. |
| 6,786,959 | B2 | 9/2004 | Hakiri et al. |
| 7,101,919 | B2 | 9/2006 | Hasegawa et al. |
| 2003/0008080 | A1* | 1/2003 | Doi et al. ................... 427/466 |
| 2003/0064206 | A1 | 4/2003 | Koyano et al. |
| 2004/0138337 | A1* | 7/2004 | Hasegawa et al. ........... 523/160 |
| 2004/0173120 | A1 | 9/2004 | Tsuru et al. |
| 2006/0209149 | A1 | 9/2006 | Hasegawa et al. |
| 2006/0272543 | A1 | 12/2006 | Hakiri et al. |

FOREIGN PATENT DOCUMENTS

| EP | 0705891 A2 | 4/1996 |
|---|---|---|
| EP | 1243435 A1 | 9/2002 |
| EP | 1454969 A1 | 9/2004 |
| JP | 8-333531 | 12/1996 |
| JP | 2000-144028 | 5/2000 |

OTHER PUBLICATIONS

European search report dated Nov. 2, 2007 in connection with corresponding European patent application No. 07 11 4177.
US 5,630,867, 05/1997, Higashiyama (withdrawn)

* cited by examiner

*Primary Examiner*—Matthew Luu
*Assistant Examiner*—Rut Patel
(74) *Attorney, Agent, or Firm*—Cooper & Dunham LLP

(57) ABSTRACT

The present invention provides a pigment dispersion that contains a carbon black, a dispersing agent and water, wherein the carbon black is any one of a channel black and a gas black, the dispersing agent is a sodium naphthalenesulfonate formalin condensate, and the total content of a dimer, a trimer and a tetramer of naphthalenesulfonate in the sodium naphthalenesulfonate formalin condensate is 20% by weight to 80% by weight. The present invention also provides an inkjet ink using the pigment dispersion.

12 Claims, 1 Drawing Sheet

PIGMENT DISPERSION, INKJET-INK USING THE PIGMENT DISPERSION, IMAGE FORMING PROCESS, AND IMAGE FORMING APPARATUS

BACKGROUND

1. Technical Field

This disclosure relates to a pigment dispersion suitably used for inkjet printing, an inkjet ink using the pigment dispersion, which enables to solve conventional problems with inkjet head-clogs and allow for obtaining high density images and is excellent in storage stability of ink liquid. The present invention also relates to an image forming process and an image forming apparatus.

2. Description of the Related Art

Inkjet recording method has advantages in that it facilitates full-color printing because the process is easier and simpler than the other recording methods and it allows for obtaining high-resolution images. As an inkjet ink, a dye-based ink is typically used in which various water-soluble dyes are dissolved in water or a mixed liquid containing water and an organic solvent, however, dye-based inks have a disadvantage in that they are poor in light resistance, although they are excellent in color tone definition. In the meanwhile, a pigment-based ink in which a carbon black or various organic pigments are dispersed is now actively studied because of its excellence in light resistance, as compared to dye-based inks. However, pigment inks tend to easily cause nozzle clogs as compared to dye-based inks.

Typically, a pigment-based ink is prepared by first preparing a dispersion in which a pigment and a dispersing agent are preliminarily dispersed in a water-soluble solvent such as water and alcohols, next dispersing the dispersion to a certain degree using a medium-type dispersing device such as sand mill, and then diluting the dispersion to a specific concentration.

Typically, in a pigment water-based ink, a hydrophobic pigment is dispersed, and thus it is usual to use a dispersing agent such as surfactant and water-soluble resin, however, there is a problem that reliability of quality of obtained images with the use of such a pigment water based ink is extremely poor. Then, aiming to improve image quality, a technique is disclosed in which a film-formable resin fine particle is added in an ink liquid. However, it is difficult to finely and stably disperse a plurality of components in a liquid for a long period of time. When a large amount of a dispersing agent such as surfactant is used to stably disperse these fine particles, there are problems with occurrence of air bubbles in an ink tank and/or an ink head, degradation in image quality and the like. To improve dispersibility of these components, there have been the following methods considered: (1) a method of changing the surface of a pigment to a surface containing a hydrophobic group(s), (2) a method of using a resin containing a hydrophobic group(s), and the like. However, employment of such a method causes a problem that when different type components are mixed, the components are unstably dispersed and the storage stability of the ink is degraded, although when one of these components is singularly used, it can be stably dispersed in a water-based ink liquid.

In addition, for the purpose of stabilizing the dispersibility of these components in a water-based ink liquid, there have been the following methods proposed. For example, a method in which a water-dispersible resin having a carboxyl group and a nonionic hydrophobic group in a molecule is dispersed in water (see Japanese Patent Application Laid-Open (JP-A) No. 5-239392); a method in which the polarity of a water-soluble polymer is uniformed to that of a surfactant or a nonionic surfactant is added in a water-based liquid (see Japanese Patent Application Laid-Open (JP-A) No. 8-283633); a method in which in an aqueous recording liquid, the polarity of a color ionic group-containing polyester resin is unified to that of hydrophobic groups of colorants (see Japanese Patent Application Laid-Open (JP-A) No. 2000-63727); and a method in which the polarity of pigments is unified to that of a resin fine particle (see Japanese Patent Application Laid-Open (JP-A) No. 2001-81366).

Further, a water-based inkjet ink composition is proposed, which contains a pigment dispersion containing a pigment particle having a specific particle size distribution, an aldehyde naphthalenesulfonate dispersion and water (see Japanese Patent Application Laid-Open (JP-A) No. 8-333531).

Japanese Patent Application Laid-Open (JP-A) No. 56-147871 proposes a recording liquid which contains a pigment, a polymer dispersing agent and a nonionic surfactant.

U.S. Pat. Nos. 5,085,698 and 5,221,334 respectively propose using an AB block copolymer or a BAB block copolymer as a dispersing agent for pigments to be used.

Further, U.S. Pat. No. 5,172,133 proposes using a specific pigment, a water-soluble resin and a solvent.

In the meanwhile, as a method of dispersing a pigment without using a dispersing agent, the following methods are proposed. Specifically, a method of inducing substituents containing water-soluble group(s) into a carbon black (see U.S. Pat. No. 5,571,311); a method in which a water-soluble monomer etc. is polymerized to the surface of a carbon black (see Japanese Patent Application Laid-Open (JP-A) No. 8-81646); and a method in which a carbon black is subjected to an oxidative treatment (see Japanese Patent Application Laid-Open (JP-A) No. 8-3498).

A method is also proposed which ensures the water resistance and ejection stability of an ink through the use of an ink containing a carbon black that has been subjected to an oxidative treatment, and a ternary copolymer that contains an acrylic resin, a styrene and an a methyl styrene (see Japanese Patent Application Laid-Open (JP-A) No. 9-194775).

Further, an inkjet recording liquid is proposed in which the volume average particle diameter of a dispersion particle is 30 nm to 200 nm (see Japanese Patent Application Laid-Open (JP-A) No. 2000-144028).

Among the above-noted conventional ink liquids mentioned above, color pigment inks actually allow for obtaining high density images, however, black pigment inks have not yet been able to provide enough performance to satisfy users, and further improvements and developments are desired.

BRIEF SUMMARY

In an aspect of this disclosure, there are provided a pigment dispersion suitably used for inkjet printing, and an inkjet ink using the pigment dispersion for obtaining high density images and that is excellent in storage stability of ink liquid, an image forming process and an image forming apparatus.

This disclosure specifies a range of naphthalenesulfonate condensation degree of a naphthalenesulfonate formalin condensate to be used as a dispersing agent, and specifies a range of a primary particle diameter and a range of BET specific surface area when producing a carbon black.

The disclosure also includes the following additional aspects:

<1> A pigment dispersion containing a carbon black, a dispersing agent, and water, wherein the carbon black is any one of a channel black and a gas black, the dispersing agent is a sodium naphthalenesulfonate formalin condensate, and the total content of a dimer, a trimer and a tetramer of naphthalenesulfonate in the sodium naphthalenesulfonate formalin condensate is 20% by weight to 80% by weight.

<2> The pigment dispersion according to the item <1>, wherein the carbon black has a BET specific surface area of 100 $m^2/g$ to 400 $m^2/g$ and an average primary particle diameter of 10 nm to 30 nm.

<3> The pigment dispersion according to the item <1>, wherein the carbon black has a volume average particle diameter (D50) of 70 nm to 180 nm in the pigment dispersion, and the standard deviation of particle diameter in a particle size distribution is one half or less of the volume average particle diameter.

<4> The pigment dispersion according to the item <1>, wherein the carbon black is contained at a ratio of 5% by weight to 50% by weight to the total content of the pigment dispersion.

<5> The pigment dispersion according to the item <1>, wherein the dispersing agent is contained at a ratio of 0.1 to 2 to 1 of the carbon black on a weight basis.

<6> An inkjet ink containing a pigment dispersion, wherein the pigment dispersion contains a carbon black, a dispersing agent and water, the carbon black is any one of a channel black and a gas black, the dispersing agent is a sodium naphthalenesulfonate formalin condensate, and the total content of a dimer, a trimer and a tetramer of naphthalenesulfonate in the sodium naphthalenesulfonate formalin condensate is 20% by weight to 80% by weight.

<7> The inkjet ink according to the item <6>, wherein the content of the carbon black in the inkjet ink is 1% by weight to 20% by weight.

<8> An ink cartridge, housing an inkjet ink, wherein the inkjet ink contains a pigment dispersion, the pigment dispersion contains a carbon black, a dispersing agent and water, the carbon black is any one of a channel black and a gas black, the dispersing agent is a sodium naphthalenesulfonate formalin condensate, and the total content of a dimer, a trimer and a tetramer of naphthalenesulfonate in the sodium naphthalenesulfonate formalin condensate is 20% by weight to 80% by weight.

<9> An image forming apparatus containing an ink-droplet ejecting unit configured to eject an inkjet ink which contains a pigment dispersion to thereby record an image, wherein the pigment dispersion contains a carbon black, a dispersing agent and water, the carbon black is any one of a channel black and a gas black, the dispersing agent is a sodium naphthalenesulfonate formalin condensate, and the total content of a dimer, a trimer and a tetramer of naphthalenesulfonate in the sodium naphthalenesulfonate formalin condensate is 20% by weight to 80% by weight.

<10> The image forming apparatus according to the item <9>, being a piezo inkjet printer.

<11> The image forming apparatus according to the item <9>, being a thermal inkjet printer.

<12> An image forming process which includes forming an image on an image support using an inkjet ink which contains a pigment dispersion, wherein the pigment dispersion contains a carbon black, a dispersing agent and water, the carbon black is any one of a channel black and a gas black, the dispersing agent is a sodium naphthalenesulfonate formalin condensate, and the total content of a dimer, a trimer and a tetramer of naphthalenesulfonate in the sodium naphthalenesulfonate formalin condensate is 20% by weight to 80% by weight.

<13> An image-formed record containing an image support, wherein an image is formed on the image support using an inkjet ink which contains a pigment dispersion, wherein the pigment dispersion contains a carbon black, a dispersing agent and water, the carbon black is any one of a channel black and a gas black, the dispersing agent is a sodium naphthalenesulfonate formalin condensate, and the total content of a dimer, a trimer and a tetramer of naphthalenesulfonate in the sodium naphthalenesulfonate formalin condensate is 20% by weight to 80% by weight.

<14> The image-formed record according to the item <13>, wherein the image support is a paper sheet.

DETAILED DESCRIPTION OF THE INVENTION

Figure 1:
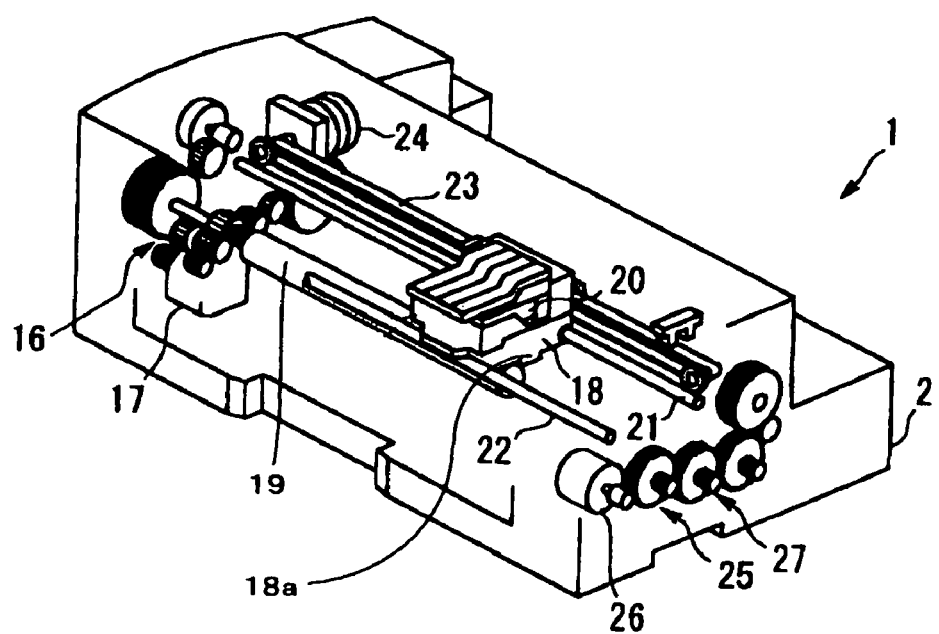
FIG. 1 is a perspective view showing one example of the inkjet recording apparatus of the present invention.

A pigment dispersion according to the present invention contains at least a carbon black, a dispersing agent and water, wherein the carbon black is at least any one of a channel black and a gas black, and the dispersing agent is a sodium naphthalenesulfonate sulfonate formalin condensate.

-Carbon Black-

In the present invention, the carbon black is at least any one of a channel black and a gas black, the production method of the carbon black is based on a gas black process, the average primary particle diameter of an obtained carbon black by the production method is 10.0 nm to 30.0 nm, and the BET specific surface area thereof is 100 $m^2/g$ to 400 $m^2/g$. The average primary particle diameter of the carbon black is preferably 15.0 nm to 20.0 nm, and the BET specific surface area thereof is preferably 150 $m^2/g$ to 300 $m^2/g$.

The average primary particle diameter of the carbon black can be measured by taking image pictures of the carbon black particle using an electron photomicrograph and calculating from the diameter of the particle and the number of particles in the photographic pictures. The BET specific surface area of the carbon black can be measured by a BET method using nitrogen absorption.

In the pigment dispersion of the present invention, the dispersing agent is preferably contained at a ratio of 0.1 to 2 to 1 of the carbon black (0.1 to 2:1) on a weight basis. More preferably, the content ratio of the dispersing agent is 0.25 to 1 to 1 of the carbon black (0.25 to 1:1). When the ratio of the content of the dispersing agent is less than 0.1, the above-noted effects are hardly obtained, and the storage stability of the pigment dispersion and the ink is degraded. As the result, nozzle clogs may easily occur. When the ratio of the content of the dispersing agent is more than 2, it tends to be difficult in printing images by an inkjet process due to the excessively high viscosity of the pigment dispersion and the ink.

In the pigment dispersion of the present invention, the content of the dispersing agent is preferably 0.1% by weight to 38% by weight, and more preferably 1.0% by weight to 20% by weight to the content of the pigment dispersion.

With employment of the above-noted dispersing agent content ratio, it is possible to set the volume average particle diameter (D50) of the pigment dispersion of the present invention to 70 nm to 180 nm and to set the standard deviation of particle diameter in the carbon black particle size distribution is one-half or less of the volume average particle diameter of the pigment dispersion. With this configuration, it is possible to provide a pigment dispersion that allows for obtaining high density image and is excellent in ejection stability and storage stability of ink liquid.

The volume average particle diameter of the carbon black is measured under the condition of 23° C. and 55% RH using a particle size distribution measuring device, UPA manufactured by NIKKISO CO., LTD. The average particle diameter (D50) of the carbon black means a particle diameter based on a volume distribution.

The total content of a dimer, a trimer and a tetramer of naphthalenesulfonate in the sodium naphthalenesulfonate formalin condensate is typically 20% by weight to 80% by weight, and more preferably 35% by weight to 65% by weight.

When the total content of a dimer, a trimer and a tetramer of naphthalenesulfonate in the sodium naphthalenesulfonate formalin condensate used as the dispersing agent is less than 20% by weight to the total content of the sodium naphthalenesulfonate formalin condensate, the dispersibility thereof is degraded, and the storage stability of the pigment dispersion and the ink is degraded, resulting in easy occurrence of nozzle clogs. In contrast, when the total content of a dimer, a trimer and a tetramer of naphthalenesulfonate in the sodium naphthalenesulfonate formalin condensate used as the dispersing agent is more than 80% by weight to the total content of the sodium naphthalenesulfonate formalin condensate, these components may be hardly dispersed because of its high viscosity.

The sodium naphthalenesulfonate formalin condensate is a condensate produced from sodium naphthalene sulfonate and formaldehyde and is not particularly limited as long as it is produced by repetition of the condensate.

The concentration of the carbon black in the pigment dispersion is preferably 5% by weight to 50% by weight, and more preferably 10% by weight to 40% by weight to the total content of the pigment dispersion. When the concentration of the carbon black is less than 5% by weight, the productivity of the pigment dispersion may be lowered, and when more than 50% by weight, the pigment dispersion may be hardly dispersed in the ink liquid because of the high viscosity of the pigment dispersion.

To the pigment dispersion of the present invention, besides water, various additives such as a water-soluble organic solvent, a nonionic surfactant, an anionic surfactant, a cationic surfactant, an amphoteric surfactant and an antiseptic agent can be added in accordance with necessity. Examples of the water-soluble organic solvent include alcohols such as methanol, ethanol, 1-propanol, and 2-propanol; polyvalent alcohols such as ethylene glycol, diethylene glycol, triethylene glycol, propylene glycol and glycerine; pyrrolidone derivatives such as N-methylpyrrolidone and 2-pyrrolidone; ketones such as acetone and methylethylketone; and alkanolamines such as monoethanol amine, dimethanol amine and triethanol amine.

The carbon black dispersion of the present invention can be obtained by dispersing the carbon black, a dispersing agent, and water, in accordance with necessity, various additives through the use of a known dispersing device such as a sand mill, a ball mill, a roller mill, a bead mill, a nanomizer and a homogenizer.

In the dispersing process, it is preferable that the content ratio of the dispersing agent is set to be 0.1 to 2 to 1 of the carbon black (0.1 to 2:1) on a weight basis and a wet-dispersion treatment is employed. The wet-dispersion treatment mentioned in the present invention means a treatment in which a mixture containing a carbon black, a dispersing agent and water, where necessary, a water-soluble organic solvent is finely ground and dispersed by means of the dispersing device by a so-called wet-dispersion process.

The thus obtained pigment dispersion of the present invention can be preferably used for a pigment-based inkjet ink, in particular.

The pigment-based inkjet ink is not particularly limited and can be produced by a known method in the art. For example, the pigment dispersion of the present invention, water, a water-soluble organic solvent, a surfactant and the like are stirred and mixed, the mixture is filtrated to remove coarse particles using a filter, a centrifugal separator or the like, then deaerated in accordance with necessity, thereby a pigment-based inkjet ink can be obtained.

The content of the carbon black in the ink is preferably 1% by weight to 20% by weight, and more preferably 3% by weight to 15% by weight. When the content of the carbon black is less than 1% by weight, images printed with use of the ink may be lack in sharpness because of low image density. When the content of the carbon black is more than 20% by mass, not only the ink viscosity tends to be high, but also nozzle clogs easily occur. In the ink liquid of the present invention, the same materials as those described in the additives to the pigment dispersion can be blended in accordance with necessity.

The water-soluble organic solvent is not particularly limited and may be suitably selected in accordance with the intended use. Examples thereof include polyvalent alcohols, polyvalent alcohol alkyl ethers, polyvalent alcohol aryl ethers, nitrogen-containing heterocyclic compounds, amides, amines, sulfur-containing compounds, propylene carbonates, ethylene carbonates and other water-soluble solvents. Each of these may be used alone or in combination with two or more.

The content of the water-soluble organic solvent is preferably 0% by weight to 50% by weight, more preferably 5% by weight to 40% by weight, and still more preferably 10% by weight to 35% by weight to the total content of the ink.

The thus obtained pigment inkjet ink of the present invention can be suitably used in an ink cartridge to house the pigment inkjet ink. An image can be formed by discharging the pigment inkjet ink of the present invention onto an image support, for example, a paper sheet, and recording or printing the image through the use of an image forming inkjet printer.

For the method of printing images, continuous injection methods and on-demand methods are exemplified. Examples of the on-demands method include piezo method, thermal method and electrostatic method.

The piezo method is a method in which a diaphragm forming a wall surface of an ink flow passage is deformed by means of a piezoelectric element as a pressure generating unit configured to pressurize an ink flowing in the ink flow passage and change the ink volume in the ink flow passage, thereby ink droplets can be ejected (see Japanese Patent Application Laid-Open (JP-A) No. 2-51734).

The thermal method is a method in which an ink is heated in an ink flow passage using a heat element or a resistive element to generate air bubbles therein, thereby ink droplets can be ejected (see Japanese Patent Application Laid-Open (JP-A) No. 61-59911).

The electrostatic method is a method in which a diaphragm forming a wall surface of an ink flow passage is deformed by applying a static electricity generated in between the diaphragm and electrodes, where the diaphragm is disposed to face the electrodes, to change the ink volume in the ink flow passage, thereby ink droplets can be ejected (see Japanese Patent Application Laid Open (JP-A) No. 6-71882).

Hereinafter, the ink cartridge and the inkjet recording apparatus of the present invention will be described with reference to FIG. 1.

In FIG. 1, an ink cartridge 20 to house the inkjet ink of the present invention is housed in a carriage 18. In FIG. 1, a plurality of the ink cartridges 20 are disposed for convenience sake, however, the plurality of the ink cartridges 20 are not necessarily required. In this state, the inkjet ink is supplied from the ink cartridge 20 to an ink droplet-ejecting head 18a which is mounted on the carriage 18. The inkjet ink is ejected from an ink-ejecting nozzle surface, although the ink-ejecting nozzle surface is not shown in FIG. 1 because it faces downward.

The ink droplet-ejecting head 18a mounted on the carriage 18 moves by motion of a timing belt 23 that is driven by a primary scanning motor 24 in a state where the ink droplet-ejecting head 18a is guided by guide shafts 21 and 22. In the meanwhile, a platen 19 places a specific coat paper (image support) at a position where the specific coat paper faces to the ink droplet-ejecting head 18a. In FIG. 1, an inkjet recording apparatus 1 is equipped with a main housing 2, a gear system 16, a sub-scanning motor 17, gear systems 25 and 27, and another primary scanning motor 26.

An image-formed record with an image printed on an image support can be obtained on demand by forming the image on the image support using an inkjet recording apparatus which houses the inkjet ink of the present invention. The inkjet ink can be replaced on a cartridge basis.

The image support is not particularly limited and may be suitably selected in accordance with the intended use. Examples thereof include regular paper, glossy paper, specialty paper, fabrics, films and OHP sheets. Of these, papers are particularly preferable.

EXAMPLES

Hereinafter, the present invention will be further described in detail with reference to specific Examples, however, the present invention is not limited to the disclosed Examples. On the contrary, the present invention is intended to cover various modifications and equivalent arrangements included within the spirit and scope of the appended claims. In the following Examples and Comparative Examples, "part" and "parts" respectively represent "part by weight" and "parts by weight"; and "%" represents "% by weight".

In the following Examples and Comparative Examples, contents of a dimer, a trimer and a tetramer in a naphthalenesulfonate condensate, an average primary particle diameter of a carbon black, and a BET specific surface area of the carbon black were respectively measured as follows.

<HPLC analysis of Naphthalenesulfonate Condensate>
  Device: LC-10vp (manufactured by Shimadzu Corporation)
  Column: ZORBAX BP-ODS (manufactured by GL Science Inc.; 4.6 id×150 mm)
  Guard column: ZORBAX BP-ODS (manufactured by GL Science; 4.0 id×10 mm)
  Detector: UV (237 nm)
  Moving phase: $CH_3CN$/0.005M PIC aqueous solution=25/75
  Flow rate: 1 mL/min
  Preparation of sample: 200 ppm soln
  Injection dose: 20 μL <Average Primary Particle Diameter of Carbon Black>
An average primary particle diameter of a carbon black was measured by taking image pictures of particles of the carbon black using an electron photomicrograph and calculating from the diameter of the particle and the number of particles in the photographic pictures.

<BET Specific Surface Area of Carbon Black>
The BET specific surface area of the carbon black was measured by BET method using nitrogen absorption.

Example 1

<Pigment Dispersion (A)>

| | |
|---|---|
| Carbon black (gas black; NIPEX160-IQ, manufactured by Degssa Co.) | 150 parts |
| Sodium naphthalenesulfonate formalin condensate (PIONINE A-45-PN manufactured by Takemoto Oil & Fat Co., Ltd.; total content of a dimer, a trimer and a tetramer of naphthalene sulfonate = 49%) | 38 parts |
| Distilled water | 812 parts |

A mixture containing the components stated above was premixed, and then the mixture was dispersed by means of a disc-type bead mill (Model-KDL batch based; manufactured by Shinmaru Enterprises Corporation) using a zirconia bead having a diameter of 0.3 mm at a circumferential speed of 10 m/s and a liquid temperature of 10° C. for 5 minutes. Then, coarse particles were separated from the mixture by means of a centrifugal separator (Model-3600, manufactured by Kubota Corporation) to thereby prepare pigment dispersions (A) shown in Tables 1 and 2.

<Ink Liquid (a)>
An ink liquid was prepared using the pigment dispersion (A) obtained by the above-noted method, based on the following formulation, and the ink liquid was stirred for 30 minutes, filtrated through a membrane filter with a pore diameter of 0.8 μm and then vacuum deaerated to thereby prepare an ink liquid (a) of Example 1.

| | |
|---|---|
| Pigment dispersion (carbon black concentration: 15%) | 100.0 parts |
| Glycerine | 7.5 parts |
| Diethylene glycol | 22.5 parts |
| 2-ethyl-1,3-hexanediol | 3.0 parts |
| 2-pyrrolidone | 3.0 parts |
| Polyoxyethylene (3) alkyl (C13) sodium acetate ether | 0.45 parts |
| Distilled water | 13.55 parts |

Example 2

A pigment dispersion (B) and an ink liquid (b) respectively shown in Tables 1 and 2 were prepared in the same manner as in Example 1, except that NIPEX150 (gas black; manufactured by Degussa Co.) was used in place of the carbon black used in Example 1.

Example 3

A pigment dispersion (C) and an ink liquid (c) respectively shown in Tables 1 and 2 were prepared in the same manner as in Example 1, except that COLOR BLACK FW18 (channel black; manufactured by Degussa Co.) was used in place of the carbon black used in Example 1.

Example 4

A pigment dispersion (D) and an ink liquid (d) respectively shown in Tables 1 and 2 were prepared in the same manner as in Example 1, except that COLOR BLACK S170 (channel black; manufactured by Degussa Co.) was used in place of the carbon black used in Example 1.

Example 5

A pigment dispersion (E) and an ink liquid (e) respectively shown in Tables 1 and 2 were prepared in the same manner as in Example 1, except that the total content of the dimer, trimer and tetramer of naphthalenesulfonate used in Example 1 was changed from 49% to 26%.

Example 6

A pigment dispersion (F) and an ink liquid (f) respectively shown in Tables 1 and 2 were prepared in the same manner as in Example 1, except that the total content of the dimer, trimer and tetramer of naphthalenesulfonate used in Example 1 was changed from 49% to 75%.

Example 7

A pigment dispersion (G) and an ink liquid (g) respectively shown in Tables 1 and 2 were prepared in the same manner as in Example 1, except that the dispersion time was changed from 5 minutes to 7 minutes.

Example 8

A pigment dispersion (H) and an ink liquid (h) respectively shown in Tables 1 and 2 were prepared in the same manner as in Example 1, except that the dispersion time was changed from 5 minutes to 3 minutes.

Example 9

A pigment dispersion (I) and an ink liquid (i) respectively shown in Tables 1 and 2 were prepared in the same manner as in Example 1, except that FW2 (channel black, manufactured by Degussa Co.) was used in place of the carbon black used in Example 1.

Comparative Example 1

A pigment dispersion (J) and an ink liquid (j) respectively shown in Tables 1 and 2 were prepared in the same manner as in Example 1, except that PRINTEX95 (furnace black; manufactured by Degussa Co.) was used in place of the carbon black used in Example 1.

Comparative Example 2

A pigment dispersion (K) and an ink liquid (k) respectively shown in Tables 1 and 2 were prepared in the same manner as in Example 1, except that PRINTEX85 (furnace black; manufactured by Degussa Co.) was used in place of the carbon black used in Example 1.

Comparative Example 3

A pigment dispersion (L) and an ink liquid (l) respectively shown in Tables 1 and 2 were prepared in the same manner as in Example 1, except that PRINTEX75 (furnace black; manufactured by Degussa Co.) was used in place of the carbon black used in Example 1.

Comparative Example 4

A pigment dispersion (M) and an ink liquid (m) respectively shown in Tables 1 and 2 were prepared in the same manner as in Example 1, except that the total content of the dimer, trimer and tetramer of naphthalenesulfonate used in Example 1 was changed from 49% to 15%.

Comparative Example 5

A pigment dispersion (N) and an ink liquid (n) respectively shown in Tables 1 and 2 were prepared in the same manner as in Example 1, except that the total content of the dimer, trimer and tetramer of naphthalenesulfonate used in Example 1 was changed from 49% to 86%.

Comparative Example 6

A pigment dispersion (O) and an ink liquid (o) respectively shown in Tables 1 and 2 were prepared in the same manner as in Example 1, except that a carbon black #850 (furnace black; manufactured by Mitsubishi Chemical Corporation) was used in place of the carbon black used in Example 1.

Comparative Example 7

A pigment dispersion (P) and an ink liquid (p) respectively shown in Tables 1 and 2 were prepared in the same manner as in Example 1, except that a carbon black #44 (furnace black; manufactured by Mitsubishi Chemical Corporation) was used in place of the carbon black used in Example 1.

Next, the volume average particle diameter (D50) of particles contained in each of the prepared pigment dispersion (A) to (P) and ink liquids (a) to (p) was measured under the environment of a temperature of 23° C. and a relative humidity (RH) of 55% using a particle size distribution measuring device, UPA, manufactured by NIKKISO CO., LTD. Table 2 shows the measurement results. Further, an image was recorded on an image support (PPC Paper 4024, manufactured by Fuji Xerox Office Supply Co., Ltd.) with each of the ink liquids (a) to (p), using an inkjet printer (MJ-930C, manufactured by SEIKO EPSON Corp.) to evaluate the pigment dispersion (A) to (P) and ink liquids (a) to (p) as to their image density, ejection stability and storage stability of ink liquid as follows. Table 2 shows the evaluation results.

<Image Density>

For the image density, the colorimetry of the solid image in the image sample was measured using X-Rite densitometer (manufactured by X-Rite Inc.).

<Ejection Stability>

For the ejection stability, after printed paper sheets were prepared by a printer using the respective pigment dispersions (A) to (P) and ink liquids of (a) to (p), the printer was left intact, in a state where the printer head was capped, under the condition of a temperature of 40° C. for 1 month. One month later, the ejection stability was evaluated by checking whether or not the ink-ejected condition of the printer could be recovered to the initial ink-ejection level based on the evaluation criteria of the number of cleaning operations stated below.

[Evaluation Criteria]

A: It could be recovered to the initial level with one cleaning time.

B: It could be recovered to the initial level with two or three cleaning times C: Could not be recovered to the initial ink-ejection level even with three or more cleaning times.

<Storage Stability of Ink Liquid>

The each of the inkjet inks was placed and sealed in a polyethylene container and then stored at 70° C. for three weeks. Thereafter, the particle diameter, surface tension and viscosity of the inkjet inks were respectively measured to obtain the change rate in physical properties from the initial physical properties. The inkjet inks were evaluated from the change rate based on the following evaluation criteria.

[Evaluation Criteria]

A: The change rate in physical properties was less than 5% in all the evaluation items of particle diameter, surface tension and viscosity.

B: The change rate in physical properties was less than 10% in all the evaluation items of particle diameter, surface tension and viscosity.

C: The change rate in physical properties was less than 30% in all the evaluation items of particle diameter, surface tension and viscosity.

D: At least one evaluation item of particle diameter, surface tension or viscosity had a change rate in physical properties of 30% or more.

TABLE 1

| Pigment dispersion/Ink | Carbon black | BET specific surface area of carbon black ($m^2/g$) | Primary particle diameter of carbon black (nm) | Total content of dimer, trimer and tetramer of sodium naphthalenesulfonate (%) |
|---|---|---|---|---|
| Ex. 1 (A)/(a) | gas black | 150 | 20 | 49 |
| Ex. 2 (B)/(b) | gas black | 110 | 25 | 49 |
| Ex. 3 (C)/(c) | channel black | 200 | 17 | 49 |
| Ex. 4 (D)/(d) | channel black | 260 | 15 | 49 |
| Ex. 5 (E)/(e) | gas black | 150 | 20 | 26 |
| Ex. 6 (F)/(f) | gas black | 150 | 20 | 75 |
| Ex. 7 (G)/(g) | gas black | 150 | 20 | 49 |
| Ex. 8 (H)/(h) | gas black | 150 | 20 | 49 |
| Ex. 9 (I)/(i) | channel black | 460 | 13 | 49 |
| Compara. Ex. 1 (J)/(j) | furnace black | 250 | 15 | 49 |
| Compara. Ex. 2 (K)/(k) | furnace black | 200 | 16 | 49 |
| Compara. Ex. 3 (L)/(l) | furnace black | 150 | 17 | 49 |
| Compara. Ex. 4 (M)/(m) | gas black | 150 | 20 | 15 |
| Compara. Ex. 5 (N)/(n) | gas black | 150 | 20 | 86 |
| Compara. Ex. 6 (O)/(o) | furnace black | 220 | 17 | 49 |
| Compara. Ex. 7 (P)/(p) | furnace black | 110 | 24 | 49 |

TABLE 2

| Pigment dispersion/Ink | Average particle diameter (D50) of particles in pigment dispersion (nm) | Particle diameter standard deviation of particles in pigment dispersion | Average particle diameter (D50) of particles in ink liquid (nm) | Particle diameter standard deviation of particles in ink liquid | Image density | Ejection stability | Storage stability |
|---|---|---|---|---|---|---|---|
| Ex. 1 (A)/(a) | 125.3 | 51.2 | 128.4 | 51.8 | 1.65 | A | A |
| Ex. 2 (B)/(b) | 112.9 | 49.0 | 115.6 | 49.3 | 1.66 | A | A |
| Ex. 3 (C)/(c) | 132.2 | 53.1 | 133.8 | 53.5 | 1.59 | A | A |
| Ex. 4 (D)/(d) | 125.2 | 50.8 | 125.8 | 51.6 | 1.63 | A | A |
| Ex. 5 (E)/(e) | 124.8 | 51.8 | 125.6 | 52.3 | 1.62 | A | A |
| Ex. 6 (F)/(f) | 127.6 | 54.2 | 127.8 | 54.3 | 1.64 | A | A |
| Ex. 7 (G)/(g) | 83.2 | 35.1 | 84.2 | 35.5 | 1.61 | A | A |
| Ex. 8 (H)/(h) | 168.2 | 70.6 | 168.9 | 71.5 | 1.64 | A | A |
| Ex. 9 (I)/(i) | 150.6 | 68.3 | 153.2 | 70.4 | 1.51 | B | B |
| Compara. Ex. 1 (J)/(j) | 120.5 | 54.8 | 121.5 | 55.6 | 1.13 | C | D |
| Compara. Ex. 2 (K)/(k) | 135.9 | 57.4 | 136.2 | 58.6 | 1.16 | C | D |
| Compara. Ex. 3 (L)/(l) | 117.2 | 54.5 | 118.3 | 55.2 | 1.18 | C | D |
| Compara. Ex. 4 (M)/(m) | 116.1 | 63.6 | 116.7 | 64.1 | 1.32 | B | D |
| Compara. Ex. 5 (N)/(n) | 123.5 | 62.3 | 127.1 | 65.3 | 1.36 | B | D |
| Compara. Ex. 6 (O)/(o) | 120.1 | 51.6 | 121.5 | 52.6 | 1.09 | C | D |
| Compara. Ex. 7 (P)/(p) | 135.1 | 57.3 | 137.2 | 60.2 | 1.07 | C | D |

The evaluation results shown in Tables 1 and 2 demonstrated that the inkjet inks using the pigment dispersions of Examples 1 to 9 respectively had a high image density and were more excellent not only in ink-ejection stability but also in storage stability of ink liquid than the inkjet inks of Comparative Examples 1 to 7.

What is claimed is:

1. A pigment dispersion, comprising:
   a carbon black,
   a dispersing agent, and
   water,
   wherein the carbon black is any one of a channel black and a gas black, the dispersing agent is a sodium naphthalenesulfonate formalin condensate, and the total content of a dimer, a trimer and a tetramer of naphthalenesulfonate in the sodium naphthalenesulfonate formalin condensate is 20% by weight to 80% by weight.

2. The pigment dispersion according to claim 1, wherein the carbon black has a BET specific surface area of 100 $m^2/g$ to 400 $m^2/g$ and an average primary particle diameter of 10 nm to 30 nm.

3. The pigment dispersion according to claim 1, wherein the carbon black has a volume average particle diameter (D50) of 70 nm to 180 nm in the pigment dispersion, and the standard deviation of particle diameter in a particle size distribution is one half or less of the volume average particle diameter.

4. The pigment dispersion according to claim 1, wherein the carbon black is contained at a ratio of 5% by weight to 50% by weight to the total content of the pigment dispersion.

5. The pigment dispersion according to claim 1, wherein the dispersing agent is contained at a ratio of 0.1 to 2 to 1 of the carbon black on a weight basis.

6. An inkjet ink, comprising:
   a pigment dispersion,
   wherein the pigment dispersion comprises a carbon black, a dispersing agent and water, the carbon black is any one of a channel black and a gas black, the dispersing agent is a sodium naphthalenesulfonate formalin condensate, and the total content of a dimer, a trimer and a tetramer of naphthalenesulfonate in the sodium naphthalenesulfonate formalin condensate is 20% by weight to 80% by weight.

7. The inkjet ink according to claim 6, wherein the content of the carbon black in the inkjet ink is 1% by weight to 20% by weight.

8. An image forming apparatus, comprising:
   an ink-droplet ejecting unit configured to eject an inkjet ink which comprises a pigment dispersion to thereby record an image,
   wherein the pigment dispersion comprises a carbon black, a dispersing agent and water, the carbon black is any one of a channel black and a gas black, the dispersing agent is a sodium naphthalenesulfonate formalin condensate, and the total content of a dimer, a trimer and a tetramer of naphthalenesulfonate in the sodium naphthalenesulfonate formalin condensate is 20% by weight to 80% by weight.

9. The image forming apparatus according to claim 8, being a piezo inkjet printer.

10. The image forming apparatus according to claim 8, being a thermal inkjet printer.

11. The pigment dispersion of claim 1, wherein a change of at least one of particle diameter, surface tension, and viscosity is less than 5% after storage at 70° C. for three weeks.

12. The pigment dispersion of claim 1, wherein a change of at least one of particle diameter, surface tension, and viscosity is less than 10% after storage at 70° C. for three weeks.

* * * * *